Patented Dec. 27, 1949

2,492,631

UNITED STATES PATENT OFFICE 2,492,631

2-ACETYL-4-METHYLTHIOPHENE

Howard D. Hartough, Pitman, N. J., and Alvin I. Kosak, Columbus, Ohio, assignors to Socony-Vacuum Oil Company, Incorporated, a corporation of New York No Drawing. Application August 22, 1946, Serial No. 692,388

6 Claims. (Cl. 260—329)

This invention relates to a new and useful composition of matter, namely, 2-acetyl-4-methylthiophene and a method for preparing the same.

As is well known to those acquainted with thiophene chemistry, the 2- and 5-positions on the thiophene ring, being adjacent to the sulfur atom, are much more reactive than the 3- and 4-positions and, in introducing substituent groups to the thiophene ring, the entering group will preferably attach itself to the carbon atom adjacent to the sulfur. When the 2-position is occupied, the substituent enters almost entirely in the 5-position. When the 3-position is occupied, the substituent group will enter for the most part in the 2-position and in some instances a small portion of the 3- and 5-product may be obtained. Thus, in the acetylation of 3-methylthiophene, the product obtained heretofore has been 2-acetyl-3-methylthiophene. It has now been discovered that if 3-methylthiophene is acetylated under the conditions hereinafter described, a new and useful composition of matter, namely, 2-acetyl-4-methylthiophene is obtained along with the normal acetylation product, namely, 2-acetyl-3-methylthiophene.

It has been found that when the acetylation of 3-methylthiophene is carried out in the presence of a strong hydroxy acid of phosphorus, the resulting reaction product mixture comprises about 80 per cent of 2-acetyl-3-methylthiophene and about 20 per cent of a new compound which has been identified as 2-acetyl-4-methylthiophene.

It is, accordingly, an object of the present invention to provide an efficient process for synthesizing 2-acetyl-4-methylthiophene. A more specific object is to afford a process for catalytically acetylating 3-methylthiophene in the presence of a strong hydroxy acid of phosphorus. A very important object is the provision of a new composition of matter, namely, 2-acetyl-4-methylthiophene, which is useful as an intermediate in chemical synthesis and particularly adapted for use as an intermediate in the manufacture of plastics, insecticides, pharmaceuticals and dyes.

The catalyst employed in the process of the present invention is a strong acid of phosphorus containing at least one hydroxy group in the molecule, such as phosphoric acid. In addition to the use of phosphoric acid as a catalyst, other hydroxy acids of phosphorus, such as phosphorous acid, are applicable for promoting the acetylation of 3-methylthiophene in accordance with the process of this invention. Other representative acidic catalysts contempalted for use in this invention are the hydroxy acids of sulfur and the fluorine-containing acids which have one or more hydroxy groups, such as fluophosphoric, dihydroxyfluoboric, fluosulfonic, toluene sulfonic and sulfuric acids. In general, hydroxy acids of fluorine, sulfur or phosphorus, having relatively high dissociation constants, that is, greater than about $1.0 \times 10^{-2}$ for the first hydrogen atom, are contemplated as catalysts in the process of this invention. The acidic catalyst may be employed in amounts as little as 0.1 per cent by weight of the reactants. However, amounts between about 1 per cent and about 8 per cent by weight are preferable.

The acetylating agents to be used may be acetic anhydride, acetyl chloride or ketene. The process may be carried out employing equimolar quantities of 3-methylthiophene and acetylating agent. However, an excess of one of the reactants appears to be desirable, resulting in an increased yield of product. The reaction rate is largely a function of the temperature, increasing with increasing temperature, the upper limit of temperature being dependent on the boiling point of the reactants at the specific pressure of the reaction. In general, temperatures varying from about −30° C. to about 150° C. and pressures varying between atmospheric and about 10 atmospheres have been found satisfactory for effecting the acetylation reaction. Ordinarily, a pressure sufficient to maintain the reactants in the liquid phase is used and this is more or less dependent upon the particular temperature involved. As a general rule, the higher the temperature, the greater the pressure and the lower the reaction time needed. It is, of course, to be understood that these reaction variables are more or less interdependent. Generally, however, the reaction period for acetylating 3-methylthiophene will be between about 1 and about 10 hours.

The process of this invention accordingly comprises mixing 3-methylthiophene, acetylating agent, and a catalyst comprising a strong hydroxy acid of phosphorus, heating the resulting mixture at a suitable temperature for a sufficient period of time to effect the acetylation of 3-methylthiophene, neutralizing the acidic product with an alkaline solution and distilling to yield a mixture of 2-acetyl-3-methylthiophene and 2-acetyl-4-methylthiophene. The resulting mixture is thereafter fractionated under reduced pressure to separate the two acetylated methylthiophenes. The catalyst will preferably be added to the mixture of reactants in substantially pure form or as a highly concentrated aqueous solution. For example, 85 per cent phosphoric acid has been found to be a particularly effective catalyst for use in the process of this invention. The concentration and volume of acid employed should be such that the acid is present in the reaction mixture, preferably in amounts of from about 1 per cent to about 8 per cent by weight of the reactants.

The following detailed example will serve to illustrate the process of this invention without limiting the same.

*Example*

To a mixture of 180 grams (10 moles) of 3-methylthiophene and 1070 grams (10 moles) of 95 per cent acetic anhydride were added 100 grams of 85 per cent orthophosphoric acid. The reaction mixture was heated and when the temperature reached 65° C., the reaction began to proceed rapidly and thereafter the mixture was heated progressively between 100 and 130° C. for 1 hour. The mixture was then cooled to 50° C., 2 liters of water were added and the material was thoroughly washed. The water layer was drawn off and washed with 300 milliliters of chloroform and the extract combined with the product. The combined organic layers were washed until neutral with dilute sodium carbonate solution. Fractionation of this mixture yielded 1034 grams of product having a boiling point at 2 millimeters pressure of 72–73° C. and 149 grams of product having a boiling point at 2 millimeters pressure of 73–88° C. Refractionation of the latter higher boiling material yielded a product which boiled at 86° C. at 3 millimeters pressure and had a refractive index at 20° C. of 1.5600. An infra-red absorption analysis showed that this product was of a purity better than 99.8 per cent 2-acetyl-4-methylthiophene.

An infra-red absorption analysis of the lower boiling sample having a boiling range of 72–73° C. at 2 millimeters pressure showed that it contained about 92 per cent 2-acetyl-3-methylthiophene and about 8 per cent 2-acetyl-4-methylthiophene. Refractionation of a portion of this material yielded a sample of 2-acetyl-3-methylthiophene of about 99 per cent purity, having a boiling point at 4 millimeters pressure of 79° C. and a refractive index at 20° C. of 1.5618.

The oximes of both compounds were prepared by standard procedures. The oxime of 2-acetyl-3-methylthiophene had a melting point of 84.5–86° C., which is in good agreement with the previously reported melting point of 85–86° C. An analysis of the oxime of 2-acetyl-3-methylthiophene showed that it contained 9.05 per cent nitrogen and 20.68 per cent sulfur. The calculated nitrogen and sulfur contents were 9.03 per cent and 20.65 per cent, respectively.

The oxime of 2-acetyl-4-methylthiophene was recrystallized from alcohol and water and melted at 132.5–134° C. An analysis of this oxime showed that it contained 9.07 per cent nitrogen and 20.82 per cent sulfur, as compared with the calculated nitrogen and sulfur contents of 9.03 per cent and 20.65 per cent, respectively.

We claim:

1. A method for preparing 2-acetyl-4-methylthiophene, comprising mixing 3-methylthiophene, an acetylating agent, and a strong hydroxy acid of phosphorus having an initial dissociation constant greater than about $1.0 \times 10^{-2}$, maintaining the resulting mixture at a suitable temperature for a sufficient period of time to effect the acetylation of 3-methylthiophene, neutralizing the resulting acidic product, distilling the neutralized material to yield a mixture of 2-acetyl-4-methylthiophene and 2-acetyl-3-methylthiophene, and fractionating said mixture to separate therefrom 2-acetyl-4-methylthiophene.

2. A method for preparing 2-acetyl-4-methylthiophene, comprising mixing 3-methylthiophene, an acetylating agent, and phosphoric acid, maintaining the resulting mixture at a temperature of between about −30° C. and about 150° C. to effect the acetylation of 3-methylthiophene, neutralizing the resulting acidic product, distilling the neutralized material to yield a mixture of 2-acetyl-4-methylthiophene and 2-acetyl-3-methylthiophene, and fractionating said mixture to separate therefrom 2-acetyl-4-methylthiophene.

3. A method for preparing 2-acetyl-4-methylthiophene, comprising mixing 3-methylthiophene, an acetylating agent, and between about 0.1 and about 8 per cent by weight of a strong hydroxy acid of phosphorus having an initial dissociation constant greater than about $1.0 \times 10^{-2}$, maintaining the resulting mixture at a temperature between about −30° C. and about 150° C. to effect acetylation of 3-methylthiophene, neutralizing the resulting acidic product, distilling the neutralized material to yield a mixture of 2-acetyl-4-methylthiophene and 2-acetyl-3-methylthiophene, and fractionating said mixture to separate therefrom 2-acetyl-4-methylthiophene.

4. A method for preparing 2-acetyl-4-methylthiophene, comprising mixing 3-methylthiophene, an acetylating agent, and between about 0.1 and about 8 per cent by weight of phosphoric acid, maintaining the resulting mixture at a temperature between about −30° C. and about 150° C. to effect acetylation of 3-methylthiophene, neutralizing the resulting acidic product, distilling the neutralized material to yield a mixture of 2-acetyl-4-methylthiophene and 2-acetyl-3-methylthiophene, and fractionating said mixture to separate therefrom 2-acetyl-4-methylthiophene.

5. A method for preparing 2-acetyl-4-methylthiophene, comprising mixing 3-methylthiophene, acetic anhydride, and phosphoric acid, maintaining the resulting mixture at a temperature between about −30° C. and about 150° C. to effect acetylation of 3-methylthiophene, neutralizing the resulting acidic product, distilling the neutralized material to yield a mixture of 2-acetyl-4-methylthiophene and 2-acetyl-3-methylthiophene, and fractionating said mixture to separate therefrom 2-acetyl-4-methylthiophene.

6. A method for preparing 2-acetyl-4-methylthiophene, comprising mixing 3-methylthiophene, acetic anhydride, and between about 0.1 and about 8 per cent by weight of phosphoric acid, maintaining the resulting mixture at a temperature between about −30° C. and about 150° C. to effect acetylation of 3-methylthiophene, neutralizing the resulting acidic product, distilling the neutralized material to yield a mixture of 2-acetyl-4-methylthiophene and 2-acetyl-3-methylthiophene, and fractionating said mixture to separate therefrom 2-acetyl-4-methylthiophene.

HOWARD D. HARTOUGH.
ALVIN I. KOSAK.

REFERENCES CITED

The following references are of record in the file of this patent:

Chemical abstracts, 30:3422 (7) (1936).
Beilstein, vol. 17, pages 295 and 296 (1933).
Demuth, Ber. Deut. Chem. Ges. 19, 679 (1886) QD1D4.